(12) United States Patent
Schlautmann

(10) Patent No.: US 10,307,837 B2
(45) Date of Patent: *Jun. 4, 2019

(54) CLAMPING FIXTURE

(71) Applicant: RINGSPANN GmbH, Bad Homburg (DE)

(72) Inventor: Volker Schlautmann, Griesheim (DE)

(73) Assignee: RINGSPANN GMBH, Bad Homburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/498,656

(22) Filed: Apr. 27, 2017

(65) Prior Publication Data
US 2017/0225238 A1    Aug. 10, 2017

Related U.S. Application Data

(63) Continuation of application No. 14/471,605, filed on Aug. 28, 2014, now Pat. No. 9,662,715.

(30) Foreign Application Priority Data

Sep. 2, 2013    (DE) .................. 10 2013 217 401

(51) Int. Cl.
| | | |
|---|---|---|
| *B23B 31/02* | (2006.01) | |
| *B23B 31/40* | (2006.01) | |
| *B23B 31/20* | (2006.01) | |

(52) U.S. Cl.
CPC ........ *B23B 31/4006* (2013.01); *B23B 31/025* (2013.01); *B23B 31/4013* (2013.01);
(Continued)

(58) Field of Classification Search
CPC ............ B23B 31/4006; B23B 31/4013; B23B 31/202; B23B 31/20; B23B 2231/2043;
(Continued)

(56) References Cited

U.S. PATENT DOCUMENTS

| | | | | |
|---|---|---|---|---|
| 446,549 A | * | 2/1891 | Russell | ............... B23B 31/4033 |
| | | | | 279/2.04 |
| 2,482,439 A | * | 9/1949 | Smith | ................. B23B 51/0426 |
| | | | | 144/23 |

(Continued)

FOREIGN PATENT DOCUMENTS

| | | |
|---|---|---|
| DE | 846948 | 8/1952 |
| DE | 1943325 | 1/1971 |

(Continued)

*Primary Examiner* — Eric A Gates
*Assistant Examiner* — Chwen-Wei Su
(74) *Attorney, Agent, or Firm* — Volpe and Koenig, P.C.

(57) ABSTRACT

A clamping fixture for clamping a component, in particular a workpiece or tool, having a number of clamping jaws, distributed along a periphery, which are connected by appropriate elastic flexural webs to a main body, wherein the clamping jaws are adjustable by an axially movable actuating device in a radial direction from a release position into a holding position, which clamping fixture is characterized in that the flexural webs, in their release position, are inclined in relation to an axially parallel direction radially in a direction of their respective holding positions.

18 Claims, 3 Drawing Sheets

(52) U.S. Cl.
CPC ..... *B23B 31/202* (2013.01); *B23B 2231/2043* (2013.01); *Y10T 279/1004* (2015.01); *Y10T 279/1008* (2015.01); *Y10T 279/1037* (2015.01); *Y10T 279/1054* (2015.01); *Y10T 279/1066* (2015.01); *Y10T 279/1087* (2015.01); *Y10T 279/17307* (2015.01); *Y10T 279/17376* (2015.01)

(58) Field of Classification Search
CPC . B23B 31/201; B23B 31/4033; B23B 31/207; B23B 43/02; B23B 23/00; Y10T 279/1004; Y10T 279/1037; Y10T 279/1008; Y10T 279/1087; Y10T 279/17341; Y10T 279/1041; Y10T 279/1045; Y10T 279/10; Y10T 279/1054
See application file for complete search history.

(56) References Cited

U.S. PATENT DOCUMENTS

| | | | |
|---|---|---|---|
| 2,626,811 A | | 1/1953 | Howart et al. |
| 2,680,623 A | | 6/1954 | Hasselblad et al. |
| 2,684,854 A | | 7/1954 | Howart et al. |
| 2,824,744 A | | 2/1958 | Peters |
| 2,838,317 A | | 6/1958 | Parigian |
| 2,928,680 A | * | 3/1960 | Sattler ................ B23B 31/4006 279/157 |
| 3,025,737 A | | 3/1962 | Howart et al. |
| 3,073,610 A | | 1/1963 | Mackinder et al. |
| 3,036,838 A | | 5/1965 | Barber |
| 3,517,939 A | | 6/1970 | Jaehn |
| 3,583,714 A | * | 6/1971 | Weltzer ................ B23B 31/202 279/136 |
| 4,211,123 A | | 7/1980 | Mack |
| 4,496,163 A | | 1/1985 | Bernfeld |
| 6,612,791 B1 | * | 9/2003 | Haimer ................ B23B 29/046 279/2.03 |
| 2003/0147723 A1 | | 8/2003 | Schwab |
| 2006/0104711 A1 | | 5/2006 | Muller |

FOREIGN PATENT DOCUMENTS

| | | | | |
|---|---|---|---|---|
| DE | 3540890 | | 6/1986 | |
| DE | 3223748 | | 7/1987 | |
| DE | 4317170 | | 11/2000 | |
| DE | 102010009172 | | 11/2011 | |
| DE | 202011050262 | * | 5/2012 | ........... B23B 31/201 |
| GB | 1397085 | | 6/1975 | |
| GB | 2124111 | | 2/1984 | |
| WO | WO 03066280 A1 | * | 8/2003 | ......... B23B 31/4013 |

* cited by examiner

CLAMPING FIXTURE

INCORPORATION BY REFERENCE

The following documents are incorporated herein by reference as if fully set forth: U.S. patent application Ser. No. 14/471,605, filed Aug. 28, 2014; and DE 102013217401.2, filed Sep. 2, 2013.

BACKGROUND

The present invention relates to a clamping fixture for clamping and centering a component, in particular a workpiece to be machined or a tool.

A clamping fixture of this type can be, for example, a mandrel or a chuck. A mandrel serves for the internal clamping of a hub-shaped component, in that clamping jaws arranged along a periphery are expanded in an internal bore of the component. Conversely, a chuck serves for the external clamping of a component, in that clamping jaws are clamped around an outer periphery of the component. In both cases, a clamping of the component is effected by radially acting closure force.

Expanding mandrels, for instance, in which a tubular, longitudinally multi-slotted expansion bush is expanded by an inner, longitudinally displaceable cone in order to clamp a component centrically in its bore, are known from the market place. Such expanding mandrels have the drawback that their rigidity is low compared to transversely acting machining forces. Nor is it ensured that the component bears in a defined manner against a contact surface of the clamping fixture. Each of these leads to inaccuracies in the machining.

SUMMARY

The object of the invention is therefore to define a clamping fixture, of the type stated in the introduction, which enables higher machining accuracy.

The object is achieved by a clamping fixture with one or more features of the invention. Advantageous refinements are described below and in the claims.

A clamping fixture having a number of clamping jaws, distributed along a periphery, which are connected by appropriate elastic flexural webs to a main body, is provided. The clamping jaws are adjustable by a movable actuating device including an actuating element that contacts the clamping jaws and applies a radial clamping force on the clamping jaws on a side opposite a clamping side against which the component is to be clamped in order to adjust a position of the clamping jaws in a substantially radial direction from a release position into a holding position. This is achieved by virtue of the fact that the flexural webs, in their release position, are inclined in relation to an axially parallel direction radially in the direction of their respective holding position.

In order to help the component to be clamped to be pressed against an axial contact surface, a so-called axial retraction takes place during the clamping operation. The pre-existing inclination of the flexural webs in the release position means that the clamping jaws do not perform a purely radial movement during the expansion, but instead simultaneously move axially onto the main body, on which the axial contact surface is found. The reason for this is that the clamping jaws, in the course of expansion, perform an approximately circular movement around the region at which they end on the main body. Since, in a mandrel, the center point of this circular arc lies on a smaller diameter than the clamping jaws, the clamping jaws, in their radial expansion movement, are simultaneously moved axially in the direction of the main body and thus press the part to be clamped against the axial contact surface. Hence the position of the component is clearly defined, and the clamping is effected with higher accuracy.

The angle at which the flexural webs, in the release position, are inclined in relation to the axially parallel direction is 3 to 12 degrees, more preferably 5 to 10 degrees, and most preferably about 6 degrees.

In one refinement of the invention, which can be realized irrespective of the inclination of the flexural webs, in the extension of the flexural webs which connect the clamping jaws to the main body of the clamping fixture, extension webs which protrude beyond the clamping jaws and at their ends are rigidly connected to one another by an annular end piece, are provided. As a result of these measures, the transverse rigidity of the clamping fixture is improved. In an arrangement comprising flexural webs which are connected at both ends, the areal moment of inertia, which is critical to the transverse rigidity of the clamping fixture, is several times greater than the sum of the areal moments of inertia of the individual flexural webs if these were not connected at the front end.

Following completion of the clamping operation, frictional engagement exists between the clamping jaws and the clamped component. The clamping jaws are thus held in an axially non-displaceable manner, which should produce the same stiffening effect as is achieved by the annular end piece. Surprisingly, tests by Applicant have revealed, however, that, by virtue of the extension webs rigidly connected to one another by the annular end piece, a higher clamping accuracy compared to known expanding mandrels is obtained. In particular, in tests by Applicant, concentricity errors of just a few μm were able to be attained, which was not possible with the previously used expanding mandrels. As the explanation for this, Applicant ultimately found that the cause can lie merely in the transverse rigidity of the clamping fixture, which in the course of, i.e. during, the clamping operation, compels a radial expansion of the clamping jaws which is uniform over the periphery and which is exactly equal from clamping operation to clamping operation.

In a preferred embodiment, the extension webs, in the release position, are inclined oppositely to the flexural webs. In particular, the extension webs and flexural webs can be arranged roughly in mirror symmetry to a mirror plane running radially through the clamping jaws. A conicality of the clamping surfaces of the clamping jaws in the expanded state can hereby be prevented.

The flexural webs can be formed, for instance, by segmented strips of an expansion bush or clamping sleeve slotted from the fastening end. An arrangement which is easy to realize from a production engineering viewpoint and achieves high flexural rigidity is hereby obtained.

The actuating device, with which the clamping jaws are shifted into the holding position, preferably comprises an actuating element, which, when moved under force in an axial actuating direction, applies a radial clamping force to the clamping jaws. A radial clamping force of this kind can be applied by an elastic element, which, upon axial compression by the actuating element, undergoes a radial change in dimension. Preferably, an elastic element of this kind is constituted by a plurality of flatly conical rings made of spring steel and having a characteristic slotting made up of alternating slots in the external and internal diameter of the ring, in particular by a plurality of RINGSPANN® disks, available from the assignee.

Alternatively, the actuating element can also have a conical sliding surface, which cooperates with correspondingly shaped contact surfaces of the clamping jaws in order to apply a radial clamping force to the clamping jaws.

It proves particularly advantageous if the annular end piece is mounted slidingly in relation to the actuating element. The rigidity against transversely acting machining forces can hereby be further enhanced, since the annular end piece, and with it the clamping jaws connected by the extension webs, in the event of transversely acting load, are supported on the actuating element by the mounting.

The clamping fixture can be configured as a mandrel for internal clamping in an appropriate bore of the component or as a chuck for external clamping on an appropriate outer periphery of the component.

The clamping fixture according to the invention has, in particular, an axial contact surface which is fixed in relation to the main body and against which the component, upon being clamped, is axially pressed. The contact surface against which the clamped component bears with frictional engagement defines a precise clamping position.

In addition, the invention relates to a machine tool having a clamping fixture according to the invention. A preferred application of the high-precision clamping fixture according to the invention is obtained, in particular, in the grinding of workpieces.

BRIEF DESCRIPTION OF THE DRAWINGS

Further features and advantages of the invention emerge from the following description of illustrative embodiments and from the drawings, wherein.

DETAILED DESCRIPTION OF THE PREFERRED EMBODIMENTS

Figure 1:
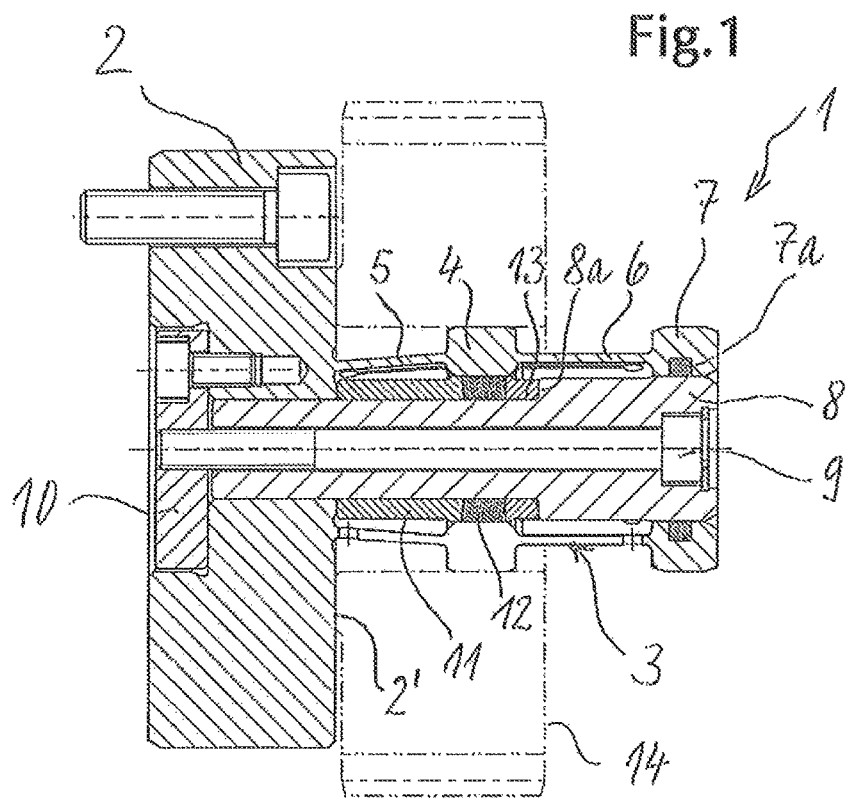
FIG. 1 shows an axial section of a mandrel according to the invention along a longitudinal axis in a first illustrative embodiment.

In FIG. 1 is represented a first illustrative embodiment of a mandrel 1 according to the invention, which can be used, for example, to clamp and center a workpiece 14 (illustrated in dash-dot representation) on the work spindle of a machine tool. The mandrel has a main body 2, with which it can be screwed by fastening screws to the work spindle of a machine tool. Integrally connected to the main body 2 is a longitudinally slotted expansion bush 3. The expansion bush 3 has in a middle region an annular projection, which serves as a clamping surface. The expansion bush 3 is divided by the longitudinal slots into a multiplicity of segmented strips; in the illustrative embodiment, these are ten segmented strips.

The segmented portions of the annular protrusion serving as a clamping surface form individual clamping jaws 4. The segmentally divided region between the clamping jaws 4 and the main body 2 constitutes elastic flexural webs 5, which resiliently connect the clamping jaws 4 to the main body 2. In this region, the expansion bush 3 tapers conically from the clamping jaws 4 toward the main body 2, so that the flexural webs, in their slackened position (release position), are inclined radially outward starting from the main body 2, to be precise, in the illustrative embodiment, by an angle of about 6 degrees in relation to the mandrel axis.

On that side of the expansion bush 3 which is remote from the main body 2, the flexural webs 5 continue onward into segmentally divided extension webs 6, which are likewise flexibly deformable. The extension webs 6 end at an annular end piece 7, in the region of which the expansion bush 3 is unslotted. The segmented strips of the expansion bush 3 are thus rigidly connected to one another at the annular end piece 7. As a result of the, at both ends, rigid connection of its segmented strips, the slotted expansion bush 3 acquires approximately the transverse rigidity of an unslotted tube.

The expansion bush 3 is hollow. Inside it is fitted an actuating element 8, which continues also through an axial bore of the main body 2. The actuating element 8 is configured as an internally drilled clamping bolt, which, by a tension screw 9, can be clamped against a counter bearing 10 on the rear side of the main body 2. The clamping bolt 8 bears inside the expansion bush 3 a sleeve 11, which is supported against the main body 2 and serves as a spacer element for one or more RINGSPANN® disks 12 seated level with the clamping jaws 4 on the clamping bolt 8. On the other side of the RINGSPANN® disks 12, the clamping bolt 8 bears a ring 13 likewise serving as a spacer element. At its end facing away from the RINGSPANN® disks, the ring 13 is supported axially against a shoulder 8a of the clamping bolt 8.

If the tension screw 9 is now screwed into its counter bearing 10, then the shoulder 8a of the clamping bolt 8 axially compresses the RINGSPANN® disks 12 between the spacer elements 11 and 13. This axial actuating force produces an elastic alteration of the cone angle and thus of the diameter of the RINGSPANN® disks. Since the internal diameter of the RINGSPANN® disks 12 is supported against the shank of the clamping bolt 8, the external diameter thereof enlarges and spreads the clamping jaws 4 outward counter to the spring force of the flexural webs 5 and extension webs 6. The workpiece 14 is hereby clamped by its internal diameter and centered to the axis of the mandrel 1.

Since the length of the flexural webs 5 remains constant, the axial distance of the clamping jaws 4 to the main body 2 is shortened by virtue of the angle of inclination of the flexural webs 5 in relation to the longitudinal axis. Due to this distance shortening, the clamped workpiece 14 undergoes an axial retraction or encounters a pressing force against the axial contact surface 2' of the main body 2. The axial retraction here roughly corresponds (disregarding the sagging of the flexural webs) to the difference of the cosine-angle functions of the angles of the flexural webs 5 in the release position and holding position, multiplied by the length of the flexural webs. Thus the greater is the angle of inclination of the flexural webs in the release position, the greater is also the axial retraction which the clamping jaws undergo in the course of the expansion or apply to the workpiece. An angular range from 3 to 12 degrees in the release position has here proved advantageous.

Since the clamping bolt 8 moves axially in the clamping operation, the annular end piece 7 is mounted slidingly on the clamping bolt 8. The sliding mounting is attained by true-to-size production of the bore of the annular end piece 7 and of the external diameter of the clamping bolt 8. In a groove in the inner periphery of the annular end piece 7, moreover, is inserted a sealing ring 7a, which seals the annular end piece 7 against the external diameter of the clamping bolt 8. The sealing ring 7a can be, for instance, an O-ring made of PTFE, rubber or a fabric ring.

Figure 2:
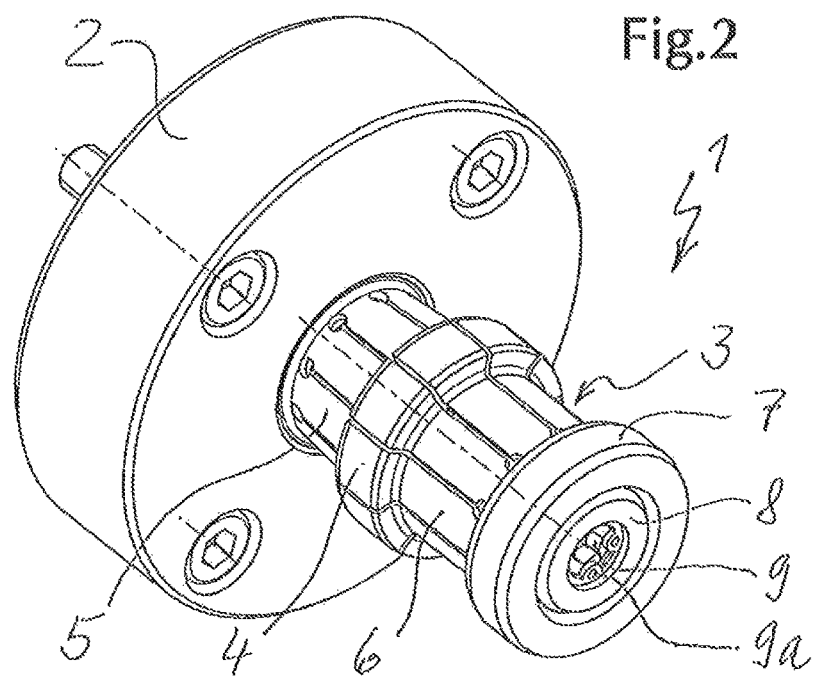
FIG. 2 shows an isometric representation of the mandrel from FIG. 1.

In FIG. 2, the mandrel 1 is shown in an isometric representation. The slotted expansion bush 3, with its annular clamping surface made up of clamping jaws 4 arranged in the shape of a circular segment, can clearly be seen. By the clamping bolt 8 located inside the expansion bush 3, which clamping bolt is tensioned against the main body 2 by the tension screw 9, the expansion bush 3 is expanded in order to clamp a workpiece (not shown). An internal locking ring 9a, which lies in a corresponding groove in the end region of the axial bore of the clamping bolt 8, ensures that the tension screw 9 can also apply to the clamping bolt 8, in the unscrewing operation, a tensile force in order to pull this, counter to possible clamping forces, back out of the expansion bush 3 through the RINGSPANN® disks in locking position and thus re-release the clamping jaws 4.

Figure 3:
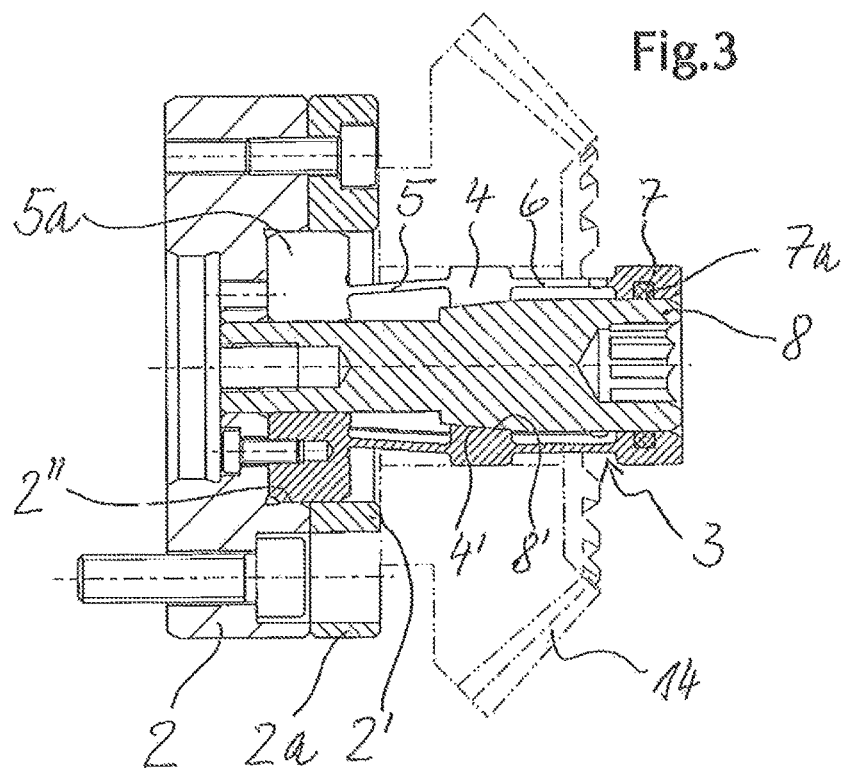
FIG. 3 shows a second illustrative embodiment of a mandrel according to the invention in an axial section.

A second illustrative embodiment of a mandrel 1 according to the invention is shown in a longitudinal section in FIG. 3. Here, as also in the other Figures, same features and features having the same effect are provided with same reference symbols. In the second illustrative embodiment, a separate annular contact plate 2a, which forms the contact surface 2' for a workpiece 14 to be clamped, is screwed on the main body 2. In the second illustrative embodiment, the expansion bush 3 is also not integrally connected to the main body 2, but is configured as a separate part and screwed in a cylindrical recess 2" of the main body 2 from the rear side of this same.

The expansion bush 3 in the second illustrative embodiment has an annular foot region 5a, from which the flexural webs 5 lead to the clamping jaws 4. On the opposite side of the clamping jaws 4, flexible extension webs 6 lead to the annular end piece 7 of the expansion bush 3. An advantage with this design is that the expansion bush 3 can be continuously slotted, already in its foot region 5a to shortly before the annular end piece 7, which, from a production engineering viewpoint, is easier to realize than a merely sectional slotting as in the first illustrative embodiment. Since the foot region 5a of the expansion bush 3 is secured in the cylindrical recess 2" and is screwed from the rear side of the main body 2 by appropriate screw connections respectively to the segments of the foot region, the slotting in the foot region 5a of the expansion bush 3 is not detrimental.

Serving in this case as the actuating mechanism for the expansion of the clamping jaws 4 is a conically tapering clamping bolt 8, which is bolted to the power-operated clamping device of the machine tool. Radially within the clamping jaws 4, the clamping bolt 8 has a conically running sliding surface 8', which bears against correspondingly shaped contact surfaces 4' of the clamping jaws 4. By virtue of the conical shape, the clamping jaws 4, upon actuation of the power-operated clamping device, are forced apart and thus clamp a workpiece 14 in its internal bore.

At its free end, the clamping bolt 8 includes teeth for an appropriate tightening tool. As in the first illustrative embodiment, the annular end piece 7 is mounted by a sealing ring 7a slidingly on the outer periphery of the clamping bolt 8.

Figure 4:
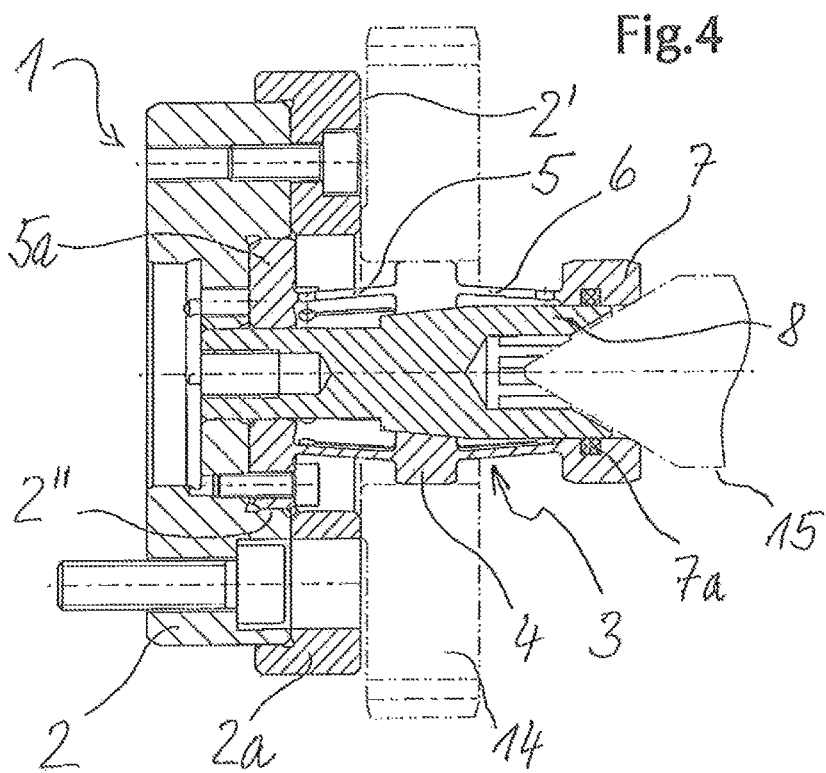
FIG. 4 shows a third illustrative embodiment of a mandrel according to the invention in an axial section.

In FIG. 4 is shown a third illustrative embodiment of a mandrel 1 according to the invention. As in the second illustrative embodiment, the expansion bush 3 is realized as a separate part and is screwed by its foot region 5a in a cylindrical recess 2" of the main body 2. The screwing of the annular foot part 5a of the clamping bush 3 in the cylindrical recess 2" of the main body 2 is here effected from the front side, however, so that the clamping bush 3, in the event of a change of workpiece, can be exchanged without the main body 2 of the mandrel having to be removed from the machine tool.

As in the second illustrative embodiment, the expansion of the clamping jaws 4 is effected by a conical clamping bolt 8. The contact surface 2' for a workpiece to be clamped is formed by a contact ring 2a screwed onto the main body 2.

As in the preceding illustrative embodiments, the annular end piece 7 of the clamping bush 3 is mounted slidingly in relation to the outer periphery of the clamping bolt 8. The end region of the clamping bolt 8 and/or of the annular end piece 7 are here shaped such that they can not only receive the customary tightening tool, but also a tailstock center 15. The mandrel 1 can thus be clamped and centered by a tailstock in order to further enhance the stability against transversely acting machining forces and the centering accuracy.

In the third illustrative embodiment, the course of the flexural webs 5 and extension webs 6 of the expansion bush 3 is of further interest. While, according to the invention, the flexural webs, in the non-spread release position, are inclined radially outward by an angle of around 6 degrees in relation to the longitudinal axis of the mandrel 1, the extension webs 6 in the first two illustrative embodiments run roughly axially parallel. This can lead to slight tilting of the clamping jaws 4 in the course of the expansion, and thus to a conicality of the clamping surface. In the third illustrative embodiment, this is very largely avoided in that the extension webs 6, in relation to the longitudinal axis, are inclined oppositely to the flexural webs 5. The course of the flexural webs 5 and extension webs 6 is here mirror-symmetrical in relation to a transverse plane through the center of the clamping jaws 4. Since the bending forces of the flexural webs 5 and extension webs 6 are thus roughly equal in size and inversely equi-directional, no tilting or conicality of the clamping surfaces arises.

Figure 5:
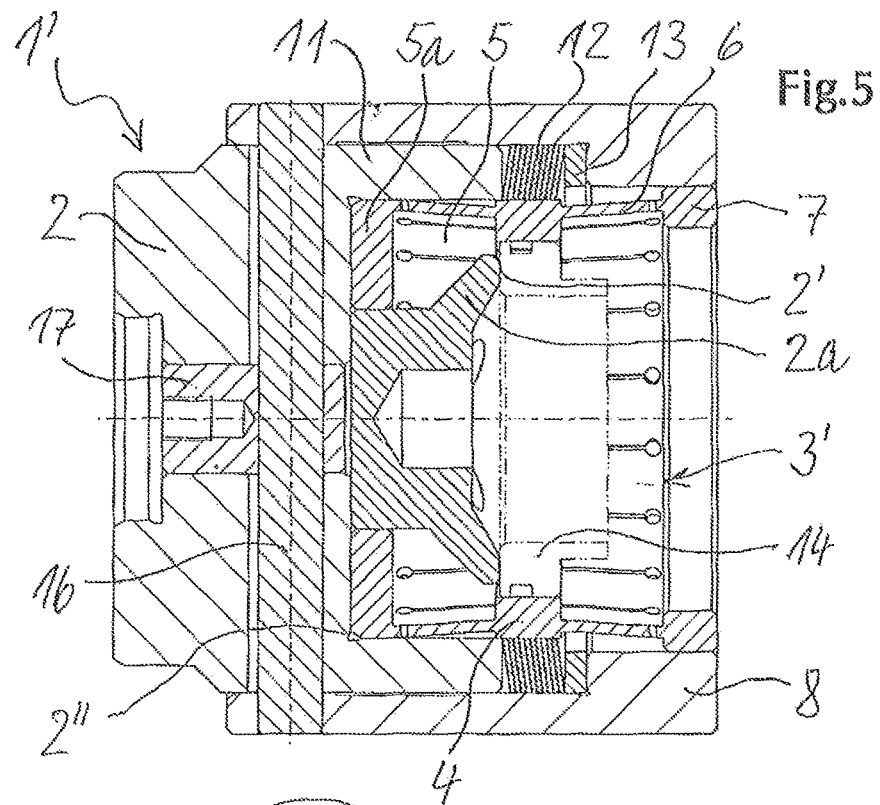
FIG. 5 shows an axial section of a chuck according to the invention.
Figure 6:
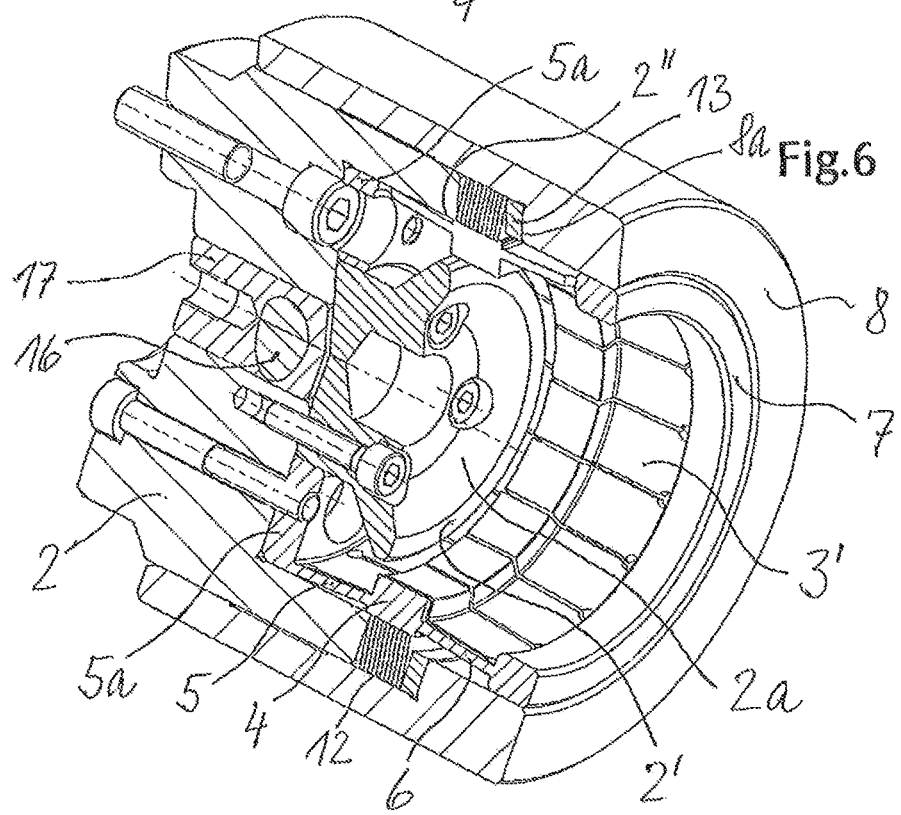
FIG. 6 shows an isometric representation of the chuck from FIG. 5 (sectioned along the longitudinal axis perpendicular to the in FIG. 5).

Finally, in FIGS. 5 and 6 is shown an illustrative embodiment of a chuck 1' according to the invention, with which a workpiece 14 can be clamped by its external diameter. The chuck 1', once again, has a main body 2, which is screwed onto the work spindle of a machine tool. The main body 2 has centrally on the front side a cylindrical recess 2", in which is inserted a longitudinally slotted clamping sleeve 3' which, given kinematic reversal of the working principle, corresponds to the expansion bush 3 of the preceding illustrative embodiments. The clamping sleeve 3' has an annular foot region 5a, by which it is screwed to the main body 2. To the foot region 5a, clamping jaws 4 are connected by appropriate flexural webs 5. On the opposite side, flexible extension webs 6 lead to an annular end part 7, by which the individual extension webs 6 of the clamping sleeve 3' are connected to one another.

The clamping sleeve 3' is surrounded by an outer sleeve 8, which is mounted axially displaceably on the chuck 1'. The outer sleeve 8 is connected by a transverse bolt 16 to a central actuating element 17, which is connected up to a power-operated clamping device of a machine tool. With a shoulder 8a formed by a step in its internal diameter, the outer sleeve 8 presses, via a ring acting as a spacer 13, onto one or more RINGSPANN® disks 12, which are supported outwardly against the outer sleeve 8. Axially, the RINGSPANN® disks 12 lie on the margin, serving as a stop 11, of the main body 2. If the central actuating element 17 is moved to the left by a clamping force, then the outer sleeve 8 presses the RINGSPANN® disks, via the shoulder 8a, against the stop 11 of the main body 2. Since the RINGSPANN® disks 12 are supported with their external diameter against the outer sleeve 8, their internal diameter diminishes and thus presses the clamping jaws 4 against a workpiece 14 to be clamped.

The axial contact surface 2' for the workpiece 14 forms a contact part 2a bolted inside the clamping sleeve 3'. As in the preceding illustrative embodiment, flexural webs 5 and extension webs 6 are inclined in relation to the axial direction, wherein the direction of inclination of the flexural webs 5, due to the kinematically reversed clamping direction, here extends radially inward to the clamping jaws. Due to the inclination of the flexural webs 5, in the clamping operation the distance between clamping jaws 4 and foot region 5a of the clamping sleeve is shortened, so that the workpiece 14, upon being clamped, undergoes an axial retraction and an axial contact pressing force against the contact surface 2'.

The outer periphery of the annular end part 7 of the clamping sleeve 3' is mounted slidingly in the outer sleeve 8, so that a high rigidity against transverse forces is obtained.

In FIG. 6, the chuck 1' is shown in a perspective, cut-open representation, without a workpiece to be clamped. The slotting of the clamping sleeve 3' and the fastening of clamping sleeve 3' and stop part 2a to the main body 2 by appropriate connecting screws can clearly be seen.

Besides the actuating mechanisms, shown in the illustrative embodiments, for shifting the clamping jaws by RINGSPANN® disks or conical contact surfaces, other arrangements for expansion or clamping of the clamping jaws are also conceivable, such as, for instance, a hydraulic actuating mechanism.

In the described illustrative embodiments, moreover, the longitudinal slots of the expansion bush 3 or of the clamping sleeve 3' can be filled with an elastic compound, for example rubber, in order to avoid penetration of dirt and chips.

In the mandrels shown, a further improvement can be achieved by the clamping bolt being connected in a rotationally fixed, yet axially displaceable manner to the end ring 7 and the main body 2. This can be brought about by an appropriate anti-twist protection, such as, for instance, a longitudinal toothing or tongue and groove geometry of the clamping bolt 8, on the one hand, and of the end ring and main body, on the other hand. It is hereby achieved that the workpiece or tool is held more torsionally rigid in the peripheral direction.

The invention claimed is:

1. A clamping fixture (1, 1') for clamping a component (14), the clamping fixture (1, 1') comprising:
a number of clamping jaws (4), distributed along a periphery, which are connected by elastic flexural webs (5) to a main body (2), the clamping jaws (4) each defining a clamping surface, the flexural webs (5) having a uniform thickness,
an axially movable actuating device (8, 12) including an actuating element that contacts the clamping jaws and applies a radial clamping force on the clamping jaws on a side opposite a clamping side against which the component is to be clamped in order to adjust a position of the clamping jaws outwardly in a substantially radial direction, against the spring force of the flexural webs, from a release position into a holding position,
wherein the flexural webs (5), in the release position, are each inclined radially outwardly in relation to an axially parallel direction as the flexural webs extend away from the main body, and
an axial contact surface (2') which is fixed in relation to the main body (2) and against which the component (14), upon being clamped, is adapted to encounter an axial contact pressure force.

2. The clamping fixture according to claim 1, wherein the flexural webs (5), in the release position, are inclined in relation to the axially parallel direction by an angle of 3 to 12 degrees.

3. The clamping fixture according to claim 1, further comprising extension webs (6) which protrude beyond the clamping jaws (4) in an extension of the flexural webs (5), the extension webs (6) include ends that are rigidly connected to one another by an annular end piece (7).

4. The clamping fixture according to claim 3, wherein the extension webs (6), in the release position, are inclined oppositely to the flexural webs (5).

5. The clamping fixture according to claim 4, wherein flexural webs (5) and the extension webs (6) are arranged roughly in mirror symmetry to a mirror plane extending radially through the clamping jaws (4).

6. The clamping fixture according to claim 3, wherein the actuating element comprises an elastic element (12) that is axially compressible to undergo a radial change in dimension to apply the radial clamping force to the clamping jaws (4), and the annular end piece (7) is mounted in axially sliding arrangement on the actuating element (8).

7. The clamping fixture according to claim 6, wherein the end piece (7) is connected in a rotationally fixed, axially displaceable manner to the main body (2).

8. The clamping fixture according to claim 3, wherein a free end of the actuating element (8) is shaped to receive a tailstock center.

9. The clamping fixture according to claim 3, wherein a free end of the annular end piece (7) is shaped to receive a tailstock center.

10. The clamping fixture according to claim 1, wherein the flexural webs (5) are formed by segmented strips of a slotted expansion bush (3) or clamping sleeve (3').

11. The clamping fixture according to claim 1, wherein the actuating element (8), comprises a ramp surface that when moved in an axial actuating direction, applies the radial clamping force to the clamping jaws (4).

12. The clamping fixture according to claim 11, wherein the ramp surface is a conical sliding surface (8'), which cooperates with correspondingly shaped contact surfaces (4') of the clamping jaws (4) in order to apply the radial clamping force to the clamping jaws (4).

13. The clamping fixture according to claim 1, wherein the actuating element comprises an elastic element (12) that is axially compressible to undergo a radial change in dimension to apply the radial clamping force to the clamping jaws (4).

14. The clamping fixture according to claim 13, wherein the elastic element is formed by flatly conical spring washers which are internally and externally slotted.

15. The clamping fixture according to claim 1, wherein the clamping fixture is configured as a mandrel (1) for internal clamping of a component (14).

16. The clamping fixture according to claim 1, further comprising an axial contact surface (2') which is fixed in relation to the main body (2) and against which the component (14), upon being clamped, is adapted to encounter an axial contact pressure force.

17. A machine tool having a clamping fixture (1, 1') according to claim 1.

18. The clamping fixture according to claim 1, wherein a surface orientation of the clamping surface of the jaws is maintained in both the release position and the holding position.

\* \* \* \* \*